United States Patent
Haugen et al.

(10) Patent No.: US 6,499,958 B2
(45) Date of Patent: *Dec. 31, 2002

(54) DEVICE AND METHOD FOR DETACHABLY CONNECTING AN IMPELLER TO A PINION SHAFT IN A HIGH SPEED FLUID COMPRESSOR

(75) Inventors: Ronald L. Haugen, Mayfield, KY (US); R. Kevin Klope, West Paducah, KY (US); Gary B. Owens, Bardwell, KY (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/892,098

(22) Filed: Jun. 26, 2001

(65) Prior Publication Data

US 2002/0006332 A1 Jan. 17, 2002

Related U.S. Application Data

(63) Continuation-in-part of application No. 09/413,698, filed on Oct. 6, 1999, now Pat. No. 6,254,349.
(60) Provisional application No. 60/142,256, filed on Jul. 2, 1999.

(51) Int. Cl.[7] .............................................. F04D 29/34
(52) U.S. Cl. ................................ 416/204 A; 416/244 A
(58) Field of Search .................... 415/216.1; 416/204 R, 416/204 A, 244 R, 244 A; 403/354, 360

(56) References Cited

U.S. PATENT DOCUMENTS

| 1,873,956 A | 8/1932 | Dahlstrand |
| 1,912,408 A | 6/1933 | Schelhammer |
| 2,179,556 A | 11/1939 | Lysholm |
| 2,438,867 A | 3/1948 | Rockwell et al. |

(List continued on next page.)

FOREIGN PATENT DOCUMENTS

| GB | 604730 | 7/1948 |
| GB | 770004 | 3/1957 |
| JP | 62017413 | 1/1987 |
| JP | 08200384 | 8/1996 |

*Primary Examiner*—Edward K. Look
*Assistant Examiner*—Ninh Nguyen
(74) *Attorney, Agent, or Firm*—Michael Best & Friedrich LLP (57) ABSTRACT

A compressor rotor assembly including an impeller including an impeller stem, the stem including a first coupling end having a first face and at least one arcuate coupling tab along the first face; the impeller stem further comprising a bore that extends inwardly from the first face, the bore having an interior wall that is tapered. The rotor assembly further comprising a pinion shaft having a second coupling end with a second face and at least one arcuate coupling slot along the second face; and a hub extending outwardly from the second face, the hub including a tapered outer wall; the first and second coupling means and the hub and bore are adapted to be mated when the impeller and pinion shaft are assembled to prevent relative displacement of the stem and shaft.

20 Claims, 7 Drawing Sheets

U.S. PATENT DOCUMENTS

| | | |
|---|---|---|
| 2,441,467 A | 5/1948 | Browning |
| 2,577,134 A | 12/1951 | Land |
| 2,602,683 A * | 7/1952 | Aue ...................... 416/244 A |
| 2,799,445 A | 7/1957 | Hull |
| 2,892,646 A | 6/1959 | Doble |
| 2,923,563 A | 2/1960 | Doble |
| 2,946,610 A | 7/1960 | Jenness |
| 2,960,939 A | 11/1960 | Buschhorn et al. |
| 3,019,039 A | 1/1962 | Clavell |
| 3,104,459 A | 9/1963 | Wendt |
| 3,131,956 A | 5/1964 | Bailey |
| 3,359,912 A | 12/1967 | Gates |
| 3,447,392 A | 6/1969 | Kawchitch |
| 3,534,640 A | 10/1970 | Macy |
| 3,597,105 A | 8/1971 | Sadler et al. |
| 3,604,819 A | 9/1971 | Krahe et al. |
| 3,666,302 A | 5/1972 | Kellett |
| 3,771,927 A | 11/1973 | Schiller |
| 3,884,595 A | 5/1975 | Herrick |
| 3,889,352 A | 6/1975 | Bosse |
| 3,936,926 A | 2/1976 | Hornschuch |
| 4,065,219 A | 12/1977 | Levine |
| 4,074,946 A | 2/1978 | Swearingen |
| 4,130,374 A | 12/1978 | Bingler |
| 4,257,744 A | 3/1981 | Watson |
| 4,294,562 A | 10/1981 | Mullenberg |
| 4,349,291 A | 9/1982 | Geary, Jr. |
| 4,400,136 A | 8/1983 | Seyffert |
| 4,411,551 A | 10/1983 | Adelbratt |
| 4,417,855 A | 11/1983 | Jepsen |
| 4,424,003 A * | 1/1984 | Brobeck ................ 416/244 A |
| 4,491,421 A | 1/1985 | Koehl et al. |
| 4,519,747 A | 5/1985 | Yamazaki et al. |
| 4,578,852 A | 4/1986 | Sauerwein et al. |
| 4,587,715 A | 5/1986 | Hallerback |
| 4,606,103 A | 8/1986 | Koehl et al. |
| 4,628,574 A | 12/1986 | Lerman |
| 4,643,648 A | 2/1987 | Huller |
| 4,688,989 A | 8/1987 | Kondo et al. |
| 4,719,074 A | 1/1988 | Tsuno et al. |
| 4,722,630 A | 2/1988 | Fang |
| 4,749,334 A | 6/1988 | Byrne |
| 4,826,347 A | 5/1989 | Baril et al. |
| 4,832,573 A | 5/1989 | Dorski |
| 4,841,622 A | 6/1989 | Murano et al. |
| 4,890,982 A | 1/1990 | Riback |
| 5,088,887 A | 2/1992 | Bosen et al. |
| 5,116,202 A | 5/1992 | Lin |
| 5,210,945 A | 5/1993 | Suzuki |
| 5,365,661 A | 11/1994 | Mizuno et al. |
| 5,407,296 A | 4/1995 | Brown |
| 5,464,300 A * | 11/1995 | Crainich ................ 403/322.1 |
| 5,482,437 A | 1/1996 | Houston et al. |
| 5,779,449 A | 7/1998 | Klein |
| 5,855,065 A | 1/1999 | Cheung |
| 6,203,238 B1 * | 3/2001 | Otto ......................... 403/354 |
| 6,254,349 B1 * | 7/2001 | Haugen et al. ......... 416/204 A |
| 6,375,595 B1 * | 4/2002 | Machida et al. ............ 403/354 |

* cited by examiner

DEVICE AND METHOD FOR DETACHABLY CONNECTING AN IMPELLER TO A PINION SHAFT IN A HIGH SPEED FLUID COMPRESSOR

This application is a continuation-in-part of U.S. patent application Ser. No. 09/413,698 filed Oct. 6, 1999 now U.S. Pat. No. 6,254,349 and claims the benefit of provisional application No. 60/142,256 filed Jul. 2, 1999.

BACKGROUND OF THE INVENTION

The present invention relates to a device and method for detachably connecting an impeller member to a pinion shaft member in a high speed fluid compressor, and more particularly the invention relates to a connection device and method where one of the members includes at least one tab that is inserted into a corresponding at least one slot provided on the other member.

A high speed fluid compressor such as a centrifugal compressor includes a rotor assembly that is comprised of an impeller that is coupled to a pinion shaft which includes a pinion gear that meshes with a drive gear to drive the impeller at high rotational velocities of up to 76,000 rpm, for example. The suitable attachment between the impeller and pinion must be able transmit torque from the pinion gear to the impeller, maintain zero relative motion of the impeller relative to the pinion, permit easy assembly and disassembly of the rotor assembly, and consistently relocate the pinion and impeller at their original relative positions when the components are reassembled. Accurate maintenance of the relative positions of the impeller and rotor is critical to ensure that the rotor assembly retains its dynamic balance.

The impeller and pinion shaft are conventionally coupled by a polygon attachment method. The principal advantages of the polygon attachment method are its ease of assembly/disassembly and self centering characteristic. The polygon must consistently lock up the impeller and pinion shaft at the same position to maintain the needed level of rotor balance. Any relative movement between the pinion shaft and impeller leads to unacceptable levels of vibration during compressor operation. To ensure the requisite consistency is obtained, the mating parts must be machined to very exacting tolerances.

Figures 1, 2:
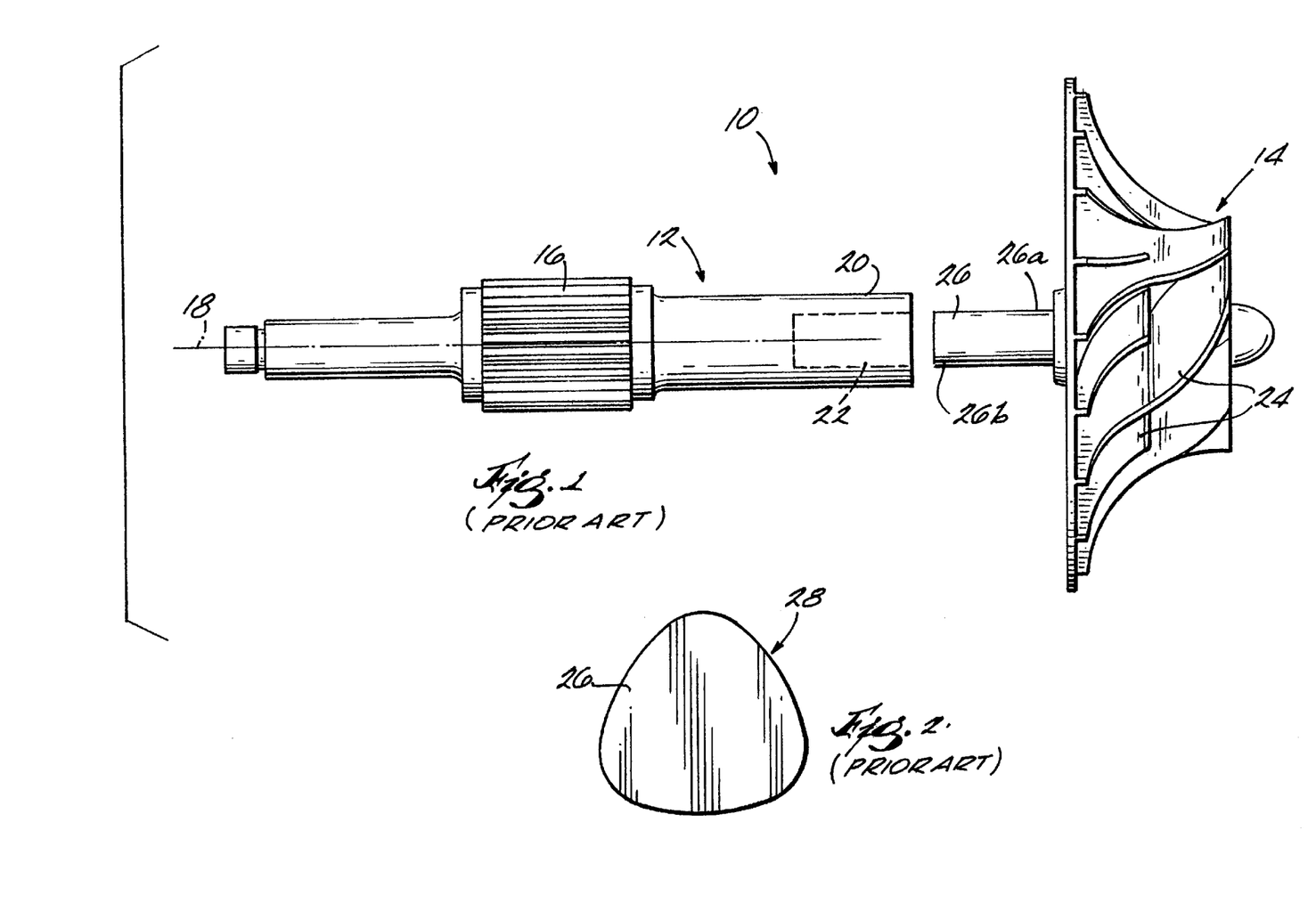
FIG. 1 is an exploded, side elevational view of an impeller and a pinion shaft of a prior art rotor assembly for a centrifugal compressor.
FIG. 2 is an end view of a polygonally dimensioned stem portion of the prior art impeller illustrated in FIG. 1.

FIG. 1 illustrates a prior art rotor assembly generally comprised of pinion shaft 12 coupled to an impeller 14 by a polygon attachment method. The pinion shaft 12 includes pinion gear 16 which is engageable with a power transmission assembly (not shown) which drives the pinion about a pinion axis 18 at a predetermined rotational velocity during operation of the centrifugal compressor. The pinion shaft 12 includes a drive end 20 which has formed therein a polygonally dimensioned bore 22. The polygonally dimensioned bore 22 has an interior bore surface which defines a generally triangular cross section composed of circular arcs.

The impeller 14 incorporates a backward-leaning type blade geometry 24, and the impeller includes a polygonally dimensioned stem portion 26 which is defined by an exterior stem surface 28. The stem portion 26 includes a first end 26a and a second end 26b. The polygonally dimensioned stem portion 26 is suitably matingly dimensioned to be received by the polygonally dimensioned bore 22. The stem portion 26 is typically dimensioned to have a cross section which deviates from a circular pattern and which has a shape that is convex on all sides and essentially elliptical, triangular or quadratic as illustrated in FIG. 2. After coupling the pinion shaft and impeller, the pinion shaft is rotated and the lobes along the stem 26 are locked against adjacent portions of bore 22.

The polygon attachment method has a number of shortcomings. The polygon attachment method is useful because it is repeatable and maintains permanent location by its shape. However, if the mating parts are not parallel and the shapes of the lobes are not accurately calculated and precisely machined, as the rotor assembly comes up to speed stresses in the components may alter the shapes of the lobes and as a result loosen the connection between the pinion shaft and impeller. Also, the compressor could experience surge or vibration that occurs during operation and as a result the surge or vibration could displace the impeller to a new location and out of balance. The polygon is expensive and difficult to manufacture. The mating polygon surfaces are difficult to measure for quality and precision. The continuous rubbing and surface contact on highly stressed polygonally shaped parts causes galling and fretting of the parts and the galling and fretting could cause the impeller and pinion shaft to be fused together.

The foregoing illustrates limitations known to exist in present devices and methods for assembling impellers and pinion shafts. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a rotor assembly that includes an impeller including an impeller stem, the stem including a first coupling end having a first face and first coupling means along the first face; and a pinion shaft having a second coupling end with a second face and second coupling means along the second face, the first and second coupling means adapted to be mated when the impeller and pinion shaft are assembled to prevent relative displacement of the impeller and pinion shaft.

The first coupling means is comprised of at least one arcuate tab, and the second coupling means is comprised of at least one arcuate slot adapted to receive the at least one arcuate tab when the impeller stem and pinion shaft are mated. Each tab includes an inner arcuate surface, and substantially planar terminating surfaces joining the inner and outer arcuate surfaces; the arcuate tabs having different arclengths and widths. If one tab is included, the tab is simply inserted into the mating slot, and if more than one tab is provided, the tabs are different with different arclengths so that they can only be inserted into their mating slot and in this way the required relative orientation between the stem and pinion shaft is maintained.

In addition to the tab/slot coupling structure the pinion shaft includes a hub that extends outwardly from the second face and is adapted to be mated with a bore formed in the impeller stem. The wall of the bore and hub are tapered so that an interference fit is created when the hub is inserted in the bore.

In summary, the present invention is comprised of an attachment device and method comprised of a set of tabs/slots and tapered cylindrical hub. The tab/slot feature is used to transmit power between the mated parts and the tab/slot feature limits assembly of the component parts to a single orientation ensuring that the pinion shaft and impeller will be assembled at the same relative position when the parts are disconnected and then reassembled. The tapered cylindrical hub achieves an interference fit between the mating parts, and thus ensures that the two mating parts do not move relatively in the radial dimension. This ensures retention of dynamic balance of the assembly. Also, the interference fit that is achieved, provides additional power transmission capability. This design provides means to achieve the needed joint stiffness, balance retention, and power transmission capabilities while it can more easily be manufactured than the conventional polygon and other attachment methods.

The foregoing and other aspects will become apparent from the following detailed description of the invention when considered in conjunction with the accompanying drawing figures.

DESCRIPTION OF THE PREFERRED EMBODIMENT

Turning now to the drawings wherein like parts are referred to by the same number throughout the several views, FIGS. 3–6 illustrate the rotor assembly coupling of the present invention.

Figure 3:
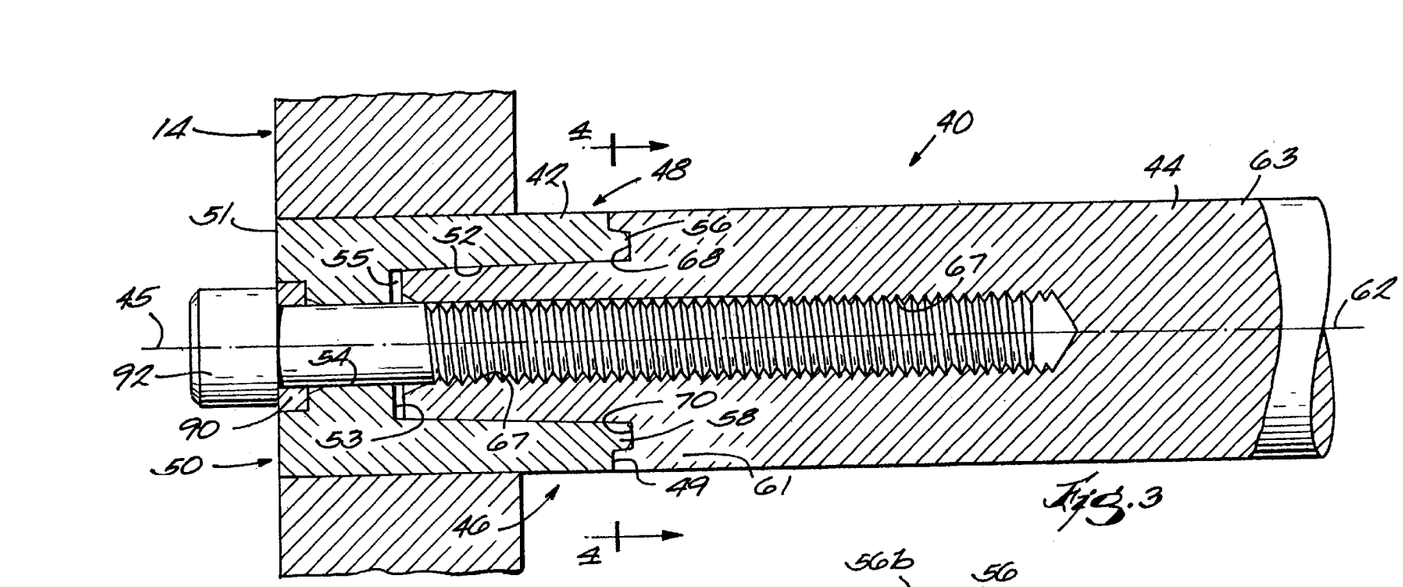
FIG. 3 is a longitudinal sectional view of the impeller and pinion shaft of the rotor assembly of our present invention.

Specifically, FIG. 3 shows the rotor assembly 40 that includes impeller 14 that is made integral with impeller stem 42, and pinion shaft 44 that includes pinion (not shown) like pinion 16. The pinion shaft and impeller shaft are detachably joined by assembly coupling 46.

As will be described hereinbelow, the assembly coupling of the present invention ensures that the mating impeller stem and pinion shaft do not move relatively in the radial dimension during compressor operation. The assembly coupling 46 provides means to achieve the needed joint stiffness, balance retention, and power transmission capabilities and it can more easily be manufactured than the conventional polygon and other attachment methods.

Figure 4:
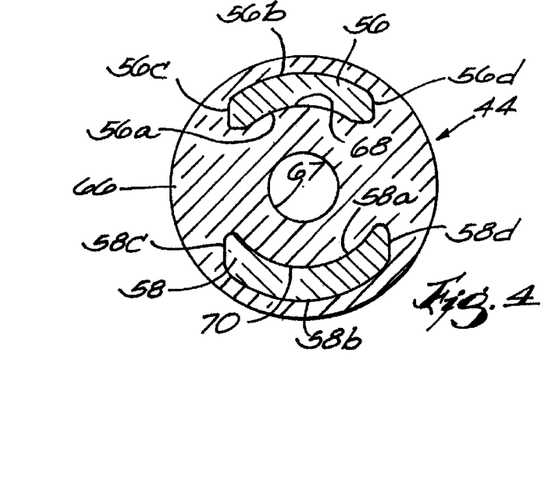
FIG. 4 is a lateral sectional view taken along line 4—4 of FIG. 3.
Figure 6:
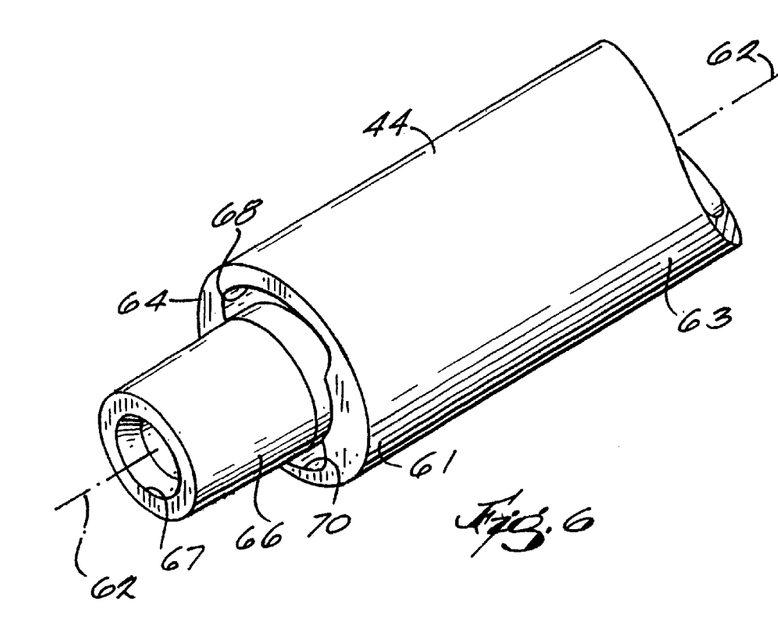
FIG. 6 is a perspective view of the coupling end of the pinion shaft of FIG. 3.

Turning to FIGS. 4 and 6, the unitary pinion shaft 44 includes a coupling end 61, a free end 63, and axis 62. The coupling end includes a lateral face 64. A coupling hub 66 extends axially away from face 64 and has a tapered exterior surface that tapers inwardly as the hub extends away from the pinion shaft lateral face 64. A threaded bore 67 adapted to receive a bolt or another conventional fastener extends along axis 62 through the hub 66 and a portion of the pinion shaft 44. Opposed arcuate slots 68 and 70 are provided in lateral face 64. Each slot includes inner and outer arcuate surfaces that are joined by substantially planar terminating surfaces. However, the arcuate slots are not the same and slot 70 has a greater arclength and width than slot 68. As shown in FIGS. 4 and 6, the slots are separated by approximately 180 degrees.

Figure 5:
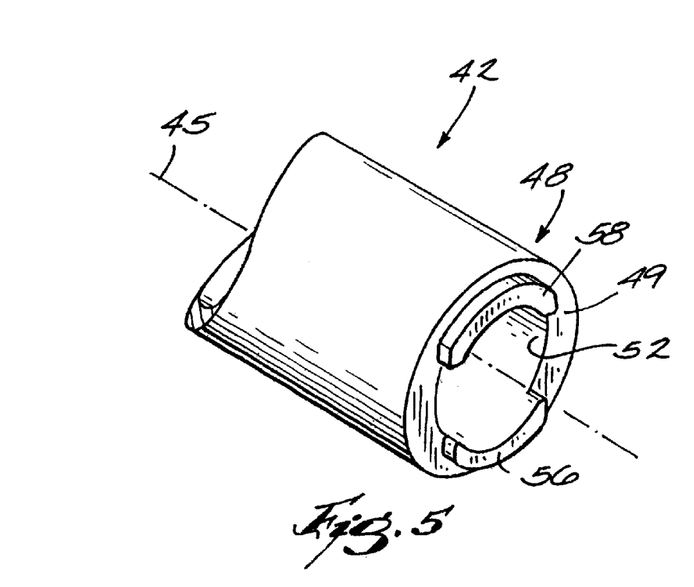
FIG. 5 is a perspective view of the coupling end of the impeller shaft of FIG. 3.

Turning now to FIGS. 4 and 5, the unitary impeller stem portion 42 includes a coupling end 48, free end 50, and longitudinal axis 45. The coupling end 48 terminates in lateral face 49 and free end 50 terminates in lateral face 51. A substantially cylindrical bore 52 extends inwardly from coupling end face 49 to position within the stem, and the bore 52 includes a wall that is tapered inwardly as it extends inwardly away from the lateral face 49. See FIG. 4. The bore terminates at lateral end face 53, and the end face and inwardly tapered side wall define a cavity 55. A countersunk bore 54 extends between bore 52 and lateral face 51.

First and second tabs 56 and 58 are provided along lateral face 51. The tabs are used to accurately and consistently relatively orient and locate the coupled impeller stem and pinion shaft. The tabs extend outwardly from lateral face 49 and are substantially perpendicular to the face and are offset by about 180 degrees. Each tab is substantially arcuate with inner and outer arcuate surfaces joined by substantially planar terminating surfaces. As shown in FIG. 4, first tab 56 includes inner and outer arcuate surfaces 56a and 56b respectively which are joined by terminating surfaces 56c and 56d, and second tab 58 includes inner and outer arcuate surfaces 58a and 58b respectively which are joined by terminating end surfaces 58c and 58d. As shown in FIG. 4, the tabs are not the same and have different arc lengths and widths. Tab 58 is adapted to be fitted into slot 70 and tab 56 is adapted to be fitted into slot 68. In this way, when the rotor assembly is disassembled, it can be assembled so that the impeller and pinion shaft are coupled in the same relative position before they were disassembled.

Although two slots and tabs are illustrated and described, it should be understood that any suitable number of mating slots and tabs may be used to obtain and maintain the desired relative positioning and orientation between the pinion shaft and impeller stem. Although in the description the tabs are provided on the stem lateral face 49, and the slots are provided on the pinion shaft lateral face 64, it should also be understood that the tabs could be provided on the pinion shaft face 64 and the slots could be provided on lateral coupling face 49.

Assembly and disassembly of the rotor assembly 40 will now be described. When it is necessary to assemble rotor assembly 40, axes 45 and 62 are aligned and hub 66 is slid into bore 52. The hub and bore are dimensioned so that as the hub is inserted into the bore an clamping load is produced as a result of the interference fit between the tapered bore and hub surfaces. It has been determined by the coinventors that the resultant clamping load is sufficient to prevent relative movement of the impeller and pinion shaft.

As the hub is slid into the bore, tabs 70 and 68 are aligned with their respective slots 58 and 56, so that the tabs are located in the respective slots when the hub is located in the bore 52. The tabs ensure the desired relative location of the stem and pinion shaft after the completion of maintenance. After seating an o-ring seal 90 in the large diameter portion of countersunk bore 54, bolt 92 is passed through bore 54 and bore 67 and is tightened until the ends of the tabs are in contact with the back of the slots. See FIG. 3.

When it is necessary to service the rotor assembly, the bolt 92 is removed and the impeller is displaced axially from its location along the pinion shaft.

Figure 7:
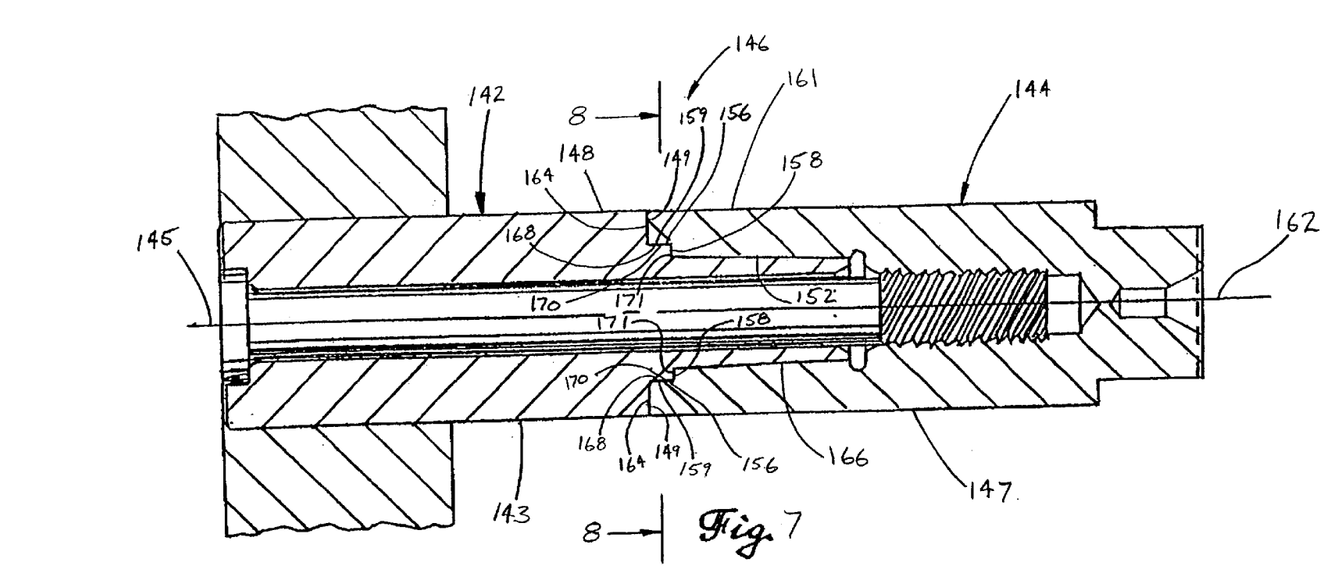
FIG. 7 is a longitudinal sectional view of the impeller and pinion shaft of the rotor assembly of an alternate embodiment.

An alternate embodiment of an assembly coupling 146 is illustrated in FIGS. 7–10. FIG. 7 shows the assembly coupling 146 that detachably joins an impeller stem 142 with a pinion shaft 144. Similar to the previously described embodiment, the assembly coupling 146 of this alternate embodiment transmits torque and prevents the mating impeller stem 142 and pinion shaft 144 from moving relative to one another in the radial dimension during operation.

Figure 9:
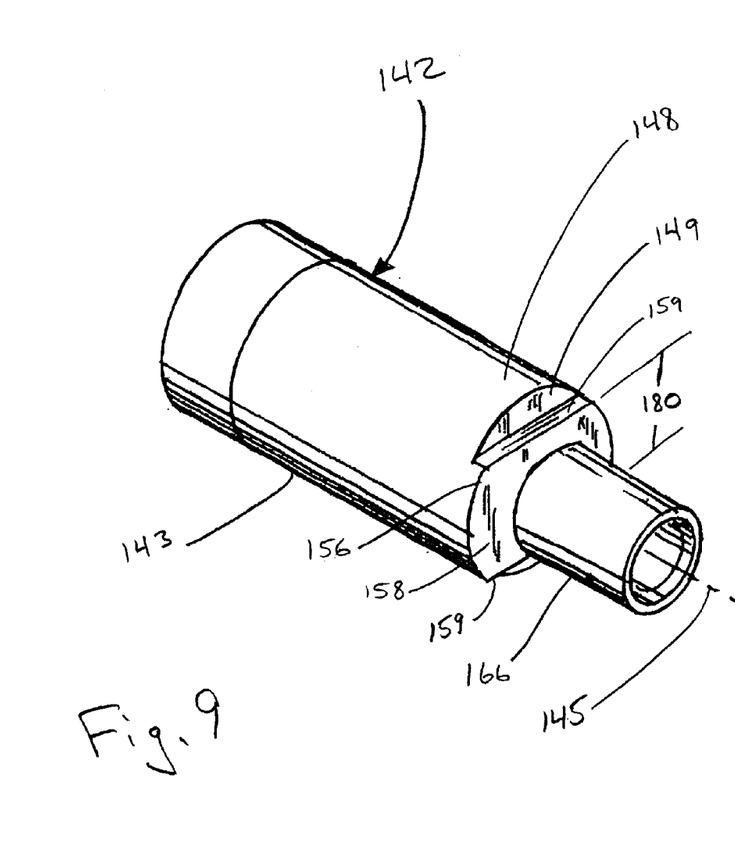
FIG. 9 is a perspective view of the coupling end of the impeller shaft of FIG. 7.

As shown in FIG. 9, the impeller stem 142 has an outer stem surface 143 around the exterior of the impeller stem 142, and a first coupling end 148 having a first coupling face 149. The first coupling face 149 is illustrated as a lateral face at the first coupling end 148 and may be transverse to an impeller axis 145. A tab 156 projects axially outward from the first coupling face 149, and terminates at a tab surface 158. The tab 156 extends across the first coupling face 149 intersecting with the outer stem surface 143. Two driving surfaces 159 extend along the sides of the tab 156 between the first coupling face 149 and the tab surface 158. A hub 166 extends axially away from the first coupling face 149, and has a tapered exterior surface that tapers radially inward as the hub 166 extends away from the first coupling face 149.

Figure 10:
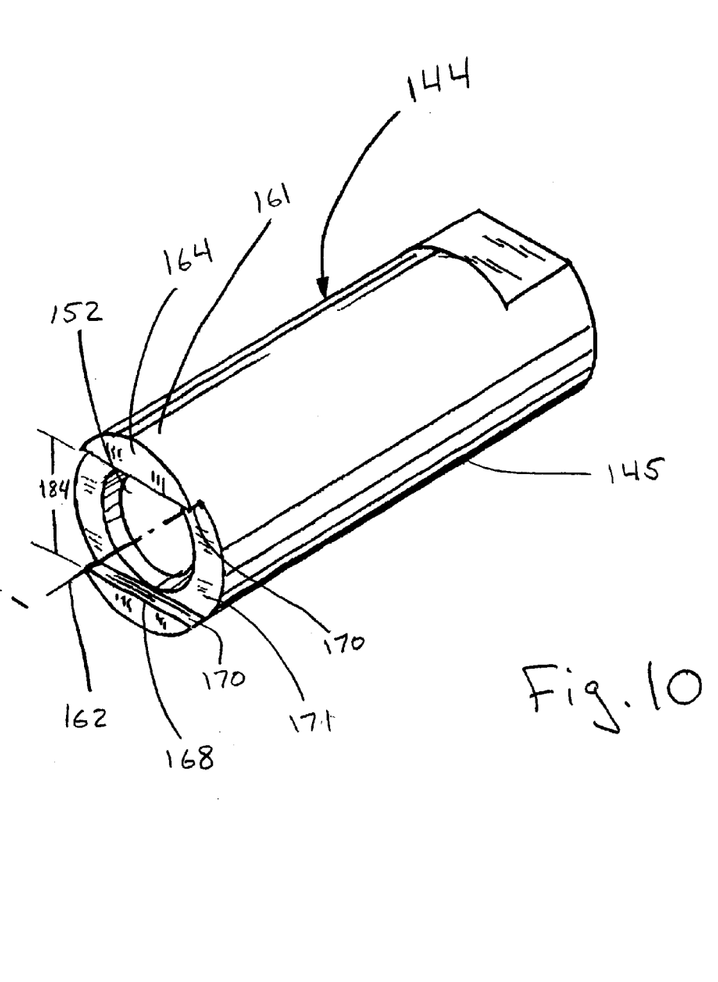
FIG. 10 is a perspective view of the coupling end of the pinion shaft of FIG. 7.

FIG. 10 illustrates the pinion shaft 144 having an outer shaft surface 147 around the exterior of the pinion shaft 144, and a second coupling end 161 having a second coupling face 164. The second coupling face 164 is illustrated as a lateral face at the second coupling end 161, and may be transverse to a pinion axis 162. A slot 168 is formed in the second coupling face 164, and extends axially inward from the second coupling face 164 terminating at a slot surface 171. The slot 168 extends across the second coupling face 164 intersecting with the outer shaft surface 147. Two side walls 170 extend between the second coupling face 164 and the slot surface 171. A cylindrical bore 152 extends axially inward from the second coupling face 164 to a position within the pinion shaft 144, and the bore 152 includes a wall that is tapered radially inward as it extends away from the second coupling face 164.

As shown in FIGS. 7–10, the hub 166 is sized to mate with the bore 152 when the impeller stem 142 and pinion shaft 144 are assembled. The mating hub 166 and bore 152 align the impeller stem 142 and pinion shaft 144, and prevent the impeller stem 142 and pinion shaft 144 from moving relative to one another in the radial direction. The hub 166 and bore 152 arrangement of this embodiment is similar to the previously described embodiment, but in this alternate embodiment the hub 166 extends from the first coupling face 149 on the impeller stem 142, and the bore 152 extends into the second coupling face 164 on the pinion shaft 144. This arrangement is reversed from the previous embodiment, shown in FIGS. 5 and 6, which illustrate the hub 66 on the pinion shaft 44 and the bore 52 in the impeller stem 42. Either arrangement is possible, and the hub 166 and the bore 152 may be disposed at either the first coupling face 149 or the second coupling face 164 as long as both the hub 166 and the bore 152 are present.

Figure 8:
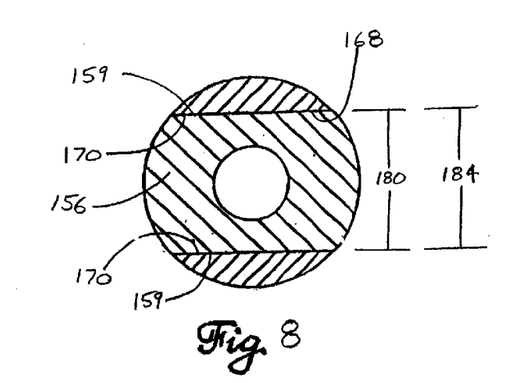
FIG. 8 is a lateral sectional view taken along line 8—8 of FIG. 7.

As illustrated in FIGS. 8–10, the tab 156 has a tab width dimension 180, and the slot 168 has a slot width dimension 184. The tab width dimension 180 is the distance between the driving surfaces 159, and the slot width dimension 184 is the distance between the side walls 170. In the illustrated arrangement, the tab width dimension 180 is greater than the diameter of the hub 166 at the intersection of the hub 166 and the tab surface 158. The slot width dimension 184 is greater than the diameter of the bore 152 at the intersection of the bore 152 and the slot surface 171.

As shown in FIGS. 7 and 8, when the impeller stem 142 and pinion shaft 144 are assembled together, the tab 156 and the slot 168 mate with one another to transmit torque between the pinion shaft 144 and impeller stem 142. The tab 156 fits within the slot 168, and the side walls 170 are aligned with the driving surfaces 159. As the pinion shaft 144 rotates about the pinion axis 162, the side walls 170 contact the driving surfaces 159 and rotate the impeller stem 142 about the impeller axis 145.

As explained above, the tab 156 and slot 168 are arranged to properly align when the impeller stem 142 and pinion shaft 144 are assembled. In FIGS. 9 and 10, the tab 156 and slot 168 may be centered about the impeller axis 145 and pinion axis 162 respectively, or the tab 156 and slot 168 may be offset from each respective axis. When the tab 156 and slot 168 are centered, the driving surfaces 159 are both substantially equidistant from the impeller axis 145, and the side walls 170 are both substantially equidistant from the pinion axis 162. With the centered arrangement, the impeller stem 142 and pinion shaft 144 may have two possible mating positions, with each mating position being a 180 degree rotation from the other mating position.

When the tab 156 and slot 168 are offset, the distance from the impeller axis 145 to each individual driving surface 159 is different, and the distance from the pinion axis 162 to each side wall 170 is different. Even though the tab 156 and slot 168 are offset, they are equally offset so that the tab 156 and slot 168 still align with one another. With the offset arrangement, the impeller stem 142 and pinion shaft 144 only have one mating position, and will always align at substantially the same orientation to one another when being reassembled.

In the illustrated arrangement, the driving surfaces 159 are substantially planar, and are substantially parallel to each other. Also, the side walls 170 are illustrated as substantially planar, and are substantially parallel to each other. Alternatively, the shape of the tab 156 and slot 168 could be altered as long as the corresponding shapes are similar and the tab 156 and slot 168 still mate with one another. For example, the tab 156 could be tapered across the first coupling face 149, and the slot 168 could be similarly tapered across the second coupling face 164. The tapered arrangement provides another arrangement in which the impeller stem 142 and pinion shaft 144 would only have one mating position, and would always align at the same orientation to one another when being reassembled.

In the previously described embodiment, the tab 156 is disposed on the first coupling face 149, and the slot 168 is disposed on the second coupling face 164. Alternatively, the slot 168 could be formed in the first coupling face 149, and the tab 156 could project outward from the second coupling face 164. The tab 156 and slot 168 design could be reversed and the assembly coupling 146 would still transmit torque between the pinion shaft 144 and impeller stem 142.

Figure 11:
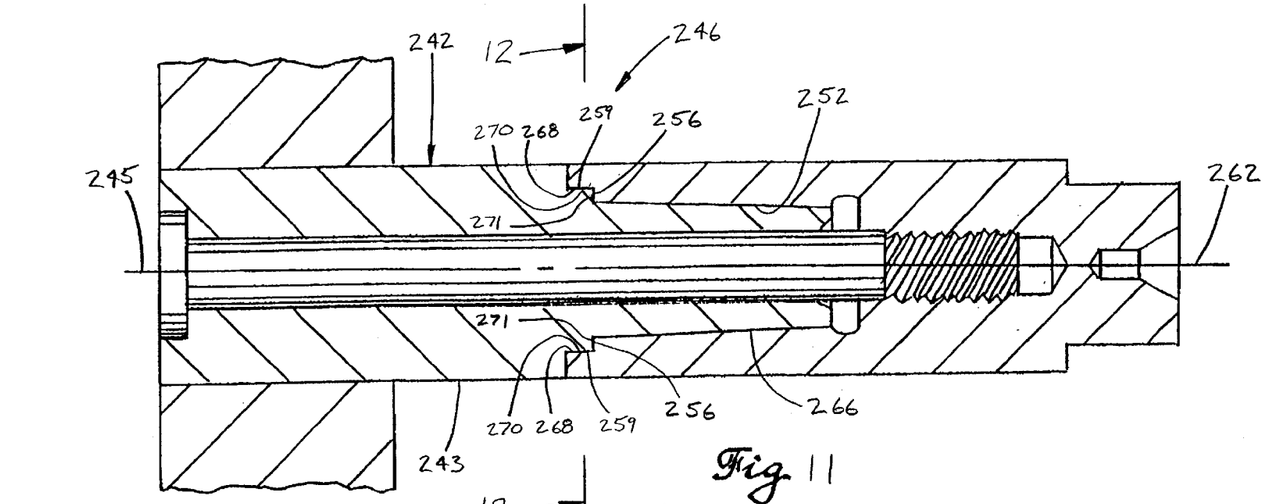
FIG. 11 is a longitudinal sectional view of the impeller and pinion shaft of the rotor assembly of another alternate embodiment.
Figure 12:
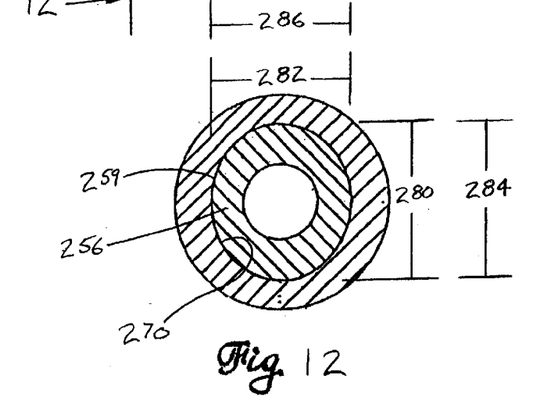
FIG. 12 is a lateral sectional view taken along line 11—11 of FIG. 11.
Figure 13:
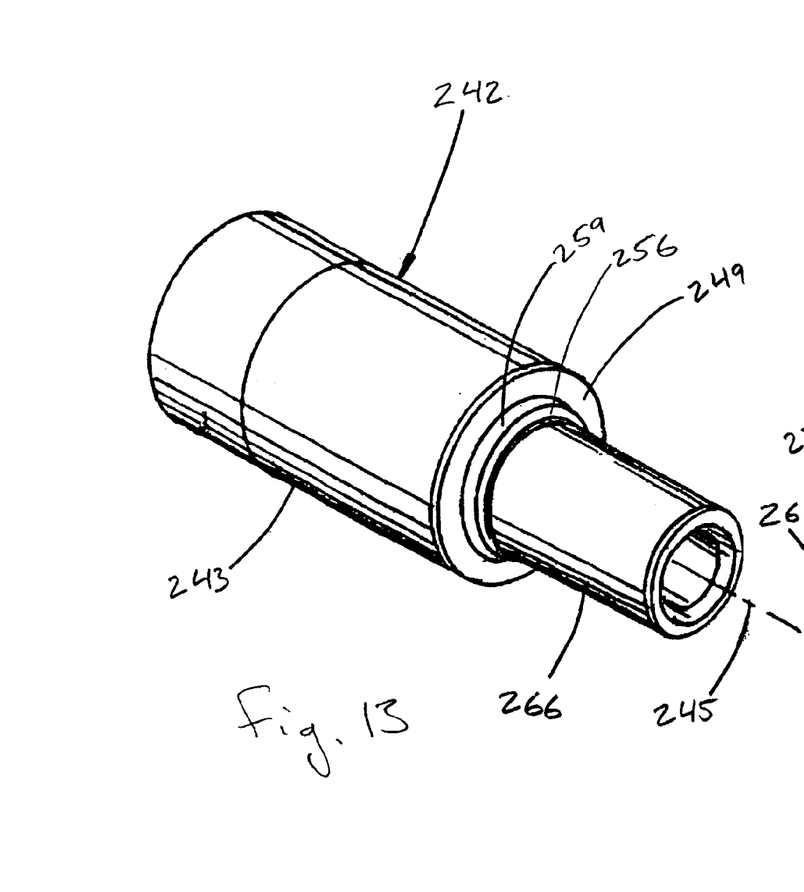
FIG. 13 is a perspective view of the coupling end of the impeller shaft of FIG. 11.

Another alternate embodiment of an assembly coupling 246 is illustrated in FIGS. 11–14. This alternate embodiment uses a hub 266 and a bore 252 arrangement similar to the previous embodiments to align an impeller stem 242 and a pinion shaft 244 radially, but a different interface is used to transmit torque between the impeller stem 242 and pinion shaft 244. As shown in FIG. 13, a raised elliptical surface 256 projects axially outward from a first coupling face 249. A driving surface 259 extends along the side of the elliptical surface 256 between the elliptical surface 256 and the first coupling surface 249. The elliptical surface 256 is substantially parallel to the first coupling face 249, and is disposed near the intersection of the first coupling face 249 and the hub 266.

As shown in FIGS. 12 and 13, the elliptical surface 256 has a maximum surface dimension 280 and a minimum surface dimension 282. The maximum surface dimension 280 represents the distance across the elliptical surface 256 at its widest point, and the minimum surface dimension 282 represents the distance across the elliptical surface 256 at its narrowest point. The maximum surface dimension 280 is shown as smaller than the diameter of the first coupling surface 249. The minimum surface dimension 282 is shown as larger than the diameter of the hub 266 at the intersection of the hub 266 and the elliptical surface 256.

Figure 14:
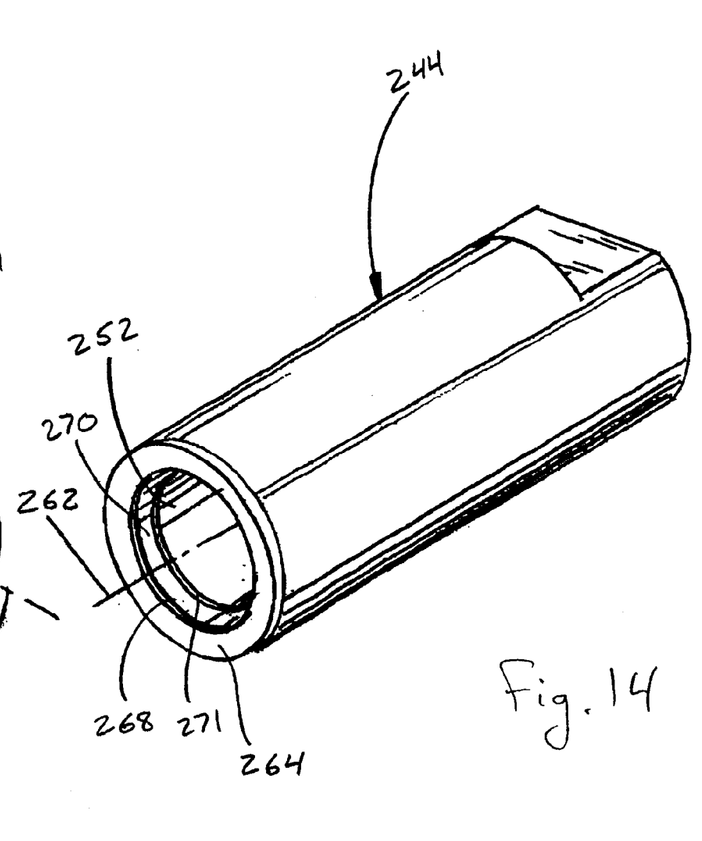
FIG. 14 is a perspective view of the coupling end of the pinion shaft of FIG. 11.

As shown in FIG. 14, an elliptical bore 268 is formed in a second coupling face 264, and extends axially inward from the second coupling face 164 terminating at a shoulder 271. A side wall 270 runs around the perimeter of the elliptical bore 268, and extends from the second coupling face 264 to the shoulder 271. The shoulder 271 intersects with the tapered wall of the cylindrical bore 252.

As shown in FIGS. 12 and 14, the elliptical bore 268 has a maximum bore dimension 284 and a minimum bore dimension 286. The maximum bore dimension 284 represents the distance across the elliptical bore 268 at its longest point, and the minimum bore dimension 286 represents the distance across the elliptical bore 268 at its shortest point. The maximum bore dimension 284 is smaller than the diameter of the second coupling surface 264. The minimum bore dimension 286 is larger than the diameter of the tapered cylindrical bore 252 at the intersection of the bore 252 and the shoulder 271.

As shown in FIGS. 11 and 12, when the impeller stem 242 and pinion shaft 244 are assembled together, the elliptical surface 256 and the elliptical bore 268 mate with one another to transmit torque between the pinion shaft 244 and impeller stem 242. The elliptical surface 256 fits within the elliptical bore 268, and the side wall 270 is aligned with the driving surface 259. As the pinion shaft 244 rotates about a pinion axis 262, the side wall 270 contacts the driving surface 259 and rotates the impeller stem 242 about a impeller axis 245.

The elliptical surface 256, as illustrated in FIGS. 12–14, is shown as symmetrical about both the maximum surface dimension 280 and the minimum surface dimension 282, and centered on the impeller axis 245. Similarly, the elliptical bore 268 is shown as symmetrical about the maximum bore dimension 284 and the minimum bore dimension 286, and centered about the pinion axis 262. With this symmetrical arrangement of the mating elliptical surface 256 and elliptical bore 268, the impeller stem 242 and pinion shaft 244 may have two possible mating positions, and each mating position being a 180 degree rotation from the other mating position.

Alternatively, the elliptical surface 256 and elliptical bore 268 may be non-symmetrical as long as they are still mating. With the non-symmetrical arrangement, the impeller stem 242 and pinion shaft 244 only have one mating position, and will always align at the substantially same orientation to one another.

The elements of this alternate embodiment could also be reversed similar to the alternative arrangements of the previously described embodiments. The elliptical surface 256 or the hub 266 could project outward from the second coupling face 264, and the elliptical bore or the cylindrical bore 252 could extend inward from the first coupling face 249. The elliptical surface 256 and elliptical bore 252 design could be reversed and the assembly coupling 246 would still transmit torque between the pinion shaft 244 and impeller stem 242.

While we have illustrated and described preferred embodiments of the invention, it is understood that this is capable of modification, and we therefore do not wish to be limited to the precise details set forth, but desire to avail ourselves of such changes and alterations as fall within the purview of the following claims.

What is claimed is:

1. A compressor rotor assembly comprising:
   an impeller having an impeller stem, the stem including an outer stem surface, and a first coupling end having a first coupling face;
   a pinion shaft including an outer shaft surface, and a second coupling end having a second coupling face;
   a hub extending outwardly from one of the first coupling face and the second coupling face, the hub including a tapered outer wall, and a bore extending inwardly from the other of the first coupling face and the second coupling face, the bore having a tapered inner wall, wherein the hub and bore are adapted to be mated when the impeller and pinion shaft are assembled; and
   a slot formed in one of the first coupling face and the second coupling face, and a tab projecting outwardly from the other of the first coupling face and the second coupling face, wherein the slot and tab mate when the impeller and pinion shaft are assembled to transmit torque between the impeller and pinion shaft.

2. The compressor of claim 1, wherein the tab extends across the first coupling face, and the tab has a width dimension which is greater than the diameter of the hub.

3. The compressor of claim 1, wherein the slot extends across the second coupling face, and the slot has a width dimension which is greater than the diameter of the bore.

4. The compressor of claim 1, wherein the tab includes two driving surfaces and two end surfaces.

5. The compressor of claim 4, wherein a portion of the outer stem surface forms the two ends surfaces.

6. The compressor of claim 4, wherein the two driving surfaces are substantially planar.

7. The compressor of claim 1, wherein the slot extends across the second coupling face between the pinion shaft surface.

8. A compressor rotor assembly comprising:
   an impeller having an impeller stem, the stem including an outer stem surface, and a first coupling end having a first coupling face;
   a pinion shaft including an outer shaft surface, and a second coupling end having a second coupling face;
   a hub extending outwardly from the first coupling face, the hub including a tapered outer wall, and a bore extending inwardly from the second coupling face, the bore having a tapered inner wall, wherein the hub and bore are adapted to be mated when the impeller and pinion shaft are assembled; and
   a slot formed in the second coupling face, and a tab projecting outwardly from the first coupling face, wherein the slot and tab mate when the impeller and pinion shaft are assembled to transmit torque between the impeller and pinion shaft.

9. The compressor of claim 8, wherein the tab extends across the first coupling face, and the tab has a width dimension which is greater than the diameter of the hub.

10. The compressor of claim 8, wherein the slot extends across the second coupling face, and the slot has a width dimension which is greater than the diameter of the bore.

11. The compressor of claim 8, wherein the tab includes two driving surfaces and two end surfaces.

12. The compressor of claim 11, wherein a portion of the outer stem surface forms the two ends surfaces.

13. The compressor of claim 11, wherein the two driving surfaces are substantially planar.

14. The compressor of claim 8, wherein the slot extends across the second coupling face between the pinion shaft surface.

15. A compressor rotor assembly comprising:
   an impeller having an impeller stem, the stem including an outer stem surface, and a first coupling end having a first coupling face;
   a pinion shaft including an outer shaft surface, and a second coupling end having a second coupling face;
   a hub extending outwardly from one of the first coupling face and the second coupling face, the hub including a tapered outer wall, and a bore extending inwardly from the other of the first coupling face and the second coupling face, the bore having a tapered inner wall, wherein the hub and bore mate when the impeller and pinion shaft are assembled; and
   a elliptical counter-bore formed in one of the first coupling face and the second coupling face, and a raised elliptical surface projecting outwardly from the other of the first coupling face and the second coupling face, wherein the elliptical counter-bore and raised elliptical surface mate when the impeller and pinion shaft are assembled to transmit torque between the impeller and pinion shaft.

16. The compressor of claim 15, wherein the elliptical surface has a maximum dimension and a minimum dimension, the maximum dimension being less than the diameter of the impeller stem and the minimum dimension being greater than the diameter of the hub.

17. The compressor of claim 15, wherein the elliptical bore has a maximum dimension and a minimum dimension, the maximum dimension being less than the diameter of the pinion shaft and the minimum dimension being greater than the diameter of the circular bore.

18. A compressor rotor assembly comprising:
   an impeller having an impeller stem, the stem including an outer stem surface, and a first coupling end having a first coupling face;
   a pinion shaft including an outer shaft surface, and a second coupling end having a second coupling face;
   a hub extending outwardly from the first coupling face, the hub including a tapered outer wall, and a bore extending inwardly from the second coupling face, the bore having a tapered inner wall, wherein the hub and bore mate when the impeller and pinion shaft are assembled; and
   an elliptical counter-bore formed in the second coupling face, and a raised elliptical surface projecting outwardly from the first coupling face, wherein the elliptical counter-bore and raised elliptical surface mate when the impeller and pinion shaft are assembled to transmit torque between the impeller and pinion shaft.

19. The compressor of claim 18, wherein the elliptical surface has a maximum dimension and a minimum dimension, the maximum dimension being less than the diameter of the impeller stem and the minimum dimension being greater than the diameter of the hub.

20. The compressor of claim 18, wherein the elliptical bore has a maximum dimension and a minimum dimension, the maximum dimension being less than the diameter of the pinion shaft and the minimum dimension being greater than the diameter of the circular bore.

* * * * *

UNITED STATES PATENT AND TRADEMARK OFFICE
CERTIFICATE OF CORRECTION

PATENT NO.    : 6,499,958 B2
DATED         : December 31, 2002
INVENTOR(S)   : Haugen et al.

It is certified that error appears in the above-identified patent and that said Letters Patent is hereby corrected as shown below:

Column 8,
Lines 37, 40, 43, 45, 47 and 49, after "compressor" insert -- rotor assembly --.

Column 9,
Lines 3, 6, 9, 11, 13, 15 and 39, after "compressor" insert -- rotor assembly --.

Column 10,
Lines 4, 29 and 34, after "compressor" insert -- rotor assembly --.

Signed and Sealed this

Twenty-ninth Day of April, 2003

JAMES E. ROGAN
*Director of the United States Patent and Trademark Office*